Sept. 29, 1953 W. J. BOWAN ET AL 2,653,790
TAMPERPROOF VALVE OR THE LIKE
Filed Jan. 19, 1950
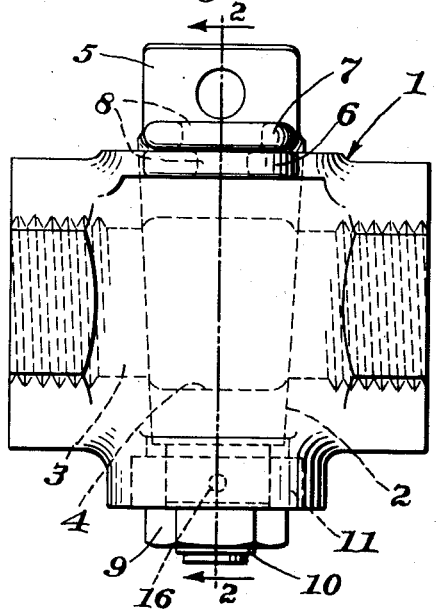
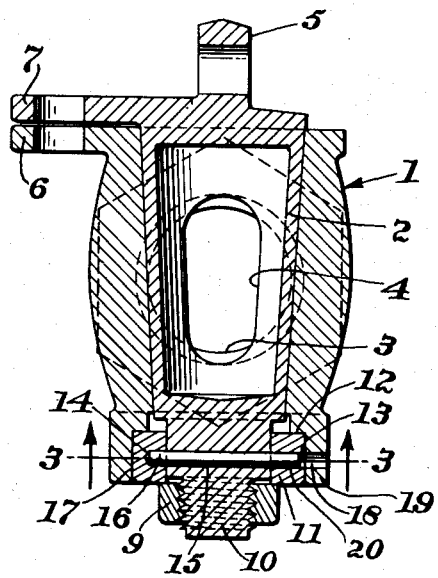
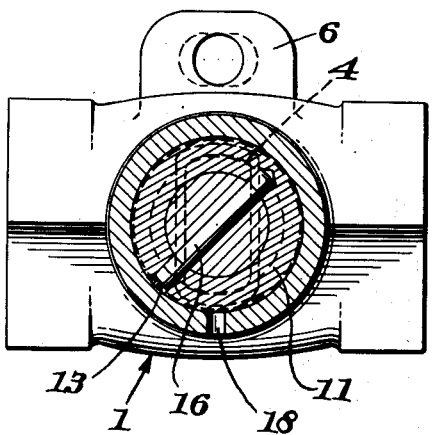
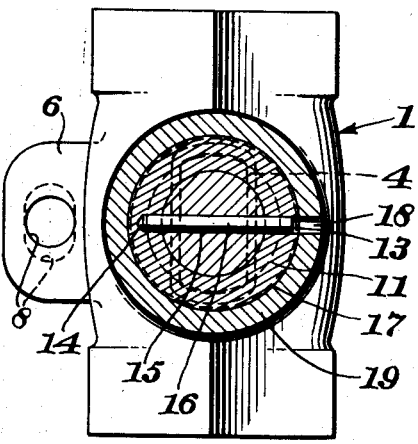
INVENTORS:
Walter J. Bowan,
Wallace E. Gould,
BY Cushman, Darby & Cushman
ATTORNEYS.

Patented Sept. 29, 1953

2,653,790

UNITED STATES PATENT OFFICE 2,653,790

TAMPERPROOF VALVE OR THE LIKE

Walter J. Bowan and Wallace E. Gould, Decatur, Ill., assignors to Mueller Co., Decatur, Ill., a corporation of Illinois Application January 19, 1950, Serial No. 139,356

9 Claims. (Cl. 251—91)

This invention relates to arrangements for rendering tamper-proof devices such as valves and the like.

Briefly, the invention contemplates fastening a retaining collar to an operated member by means of a specially arranged transverse locking pin. In particular, a transverse pin is located in a blind socket so that the pin may not be removed by driving it out. The pin is further made tamper-proof by being shielded from view by a surrounding skirt which defines a recess, and in one embodiment the location of the pin cannot be perceived from an inspection of the outside of the device.

The invention answers the need for tamper-proof features in a device such as a ground key stop commonly used in supply lines for domestic gas. In such apparatus, it is obviously highly desirable to prevent unauthorized opening or disassembly of the valve. Experience has shown that, although the valve may be locked to prohibit operation by turning, yet the valves are sometimes opened by removing the retaining means and thereby loosening the valve in its seat.

It is, therefore, an object of our invention to provide a tamper-proof valve or the like.

It is a further object of our invention to provide a pin-type securing means that cannot be driven from its seat.

It is a still further object to provide a hidden securing means to prevent tampering.

Still further objects and the entire scope of the invention will become apparent in the following description. It is to be understood that many other means of carrying out the invention will occur to those skilled in the art, and the herein description is by way of example only and not of limitation.

In the drawings:

Fig. 1 is a general side view of a valve of a type in which the invention may be embodied.

Fig. 2 is a cross-section of Fig. 1 taken along line 2—2 of Fig. 1.

Fig. 3 is a sectional view taken along line 3—3 of Fig. 1.

Fig. 4 is a sectional view, similar to Fig. 3, to show a slightly modified arrangement of the plug-securing means relative to the passageway of the valve plug.

A casing 1 is adapted to receive and seat a tapered plug or operating member 2. The casing is provided with a flow channel 3, and the plug has a transverse opening 4 to register with the channel 3 when the plug is rotated to an "on" position. The opening 4 is of such size as to be completely out of registry with the channel 3 when the valve is rotated 90° to an "off" position. The plug member 2 is provided with a handle 5 to facilitate its rotation by well known external means. The casing and plug may also have corresponding locking wings 6 and 7 which have suitable openings 8 therein for the use of a padlock, bolt, seal or the like. The casing may have several such wings, whereby the plug may be secured in several conditions of service.

The plug 2 is retained in the casing 1 by means comprising a threaded nut 9 on a retaining extension 10 of the plug, the nut serving to hold a retaining collar 11 against a shoulder 12 of the casing. This arrangement obviously permits rotation of the plug while at the same time preventing axial movement thereof in the casing. The nut may be dispensed with, however, and other below described retaining means used in place thereof.

The foregoing arrangement of parts is well known in the art, and is generally referred to as a ground key stop.

This invention is particularly concerned with the novel means below described which are additionally employed in the retention of the plug in the casing. It will be noted that the collar 11 is drilled to form a hole 13. This hole may extend completely through the collar, although in the drawings it is shown to end in a blind socket 14 in one side of the collar. The retaining extension 10 of the plug 2 is also drilled to form a hole 15 for a purpose hereinafter described.

As shown best in Fig. 2, when the plug is seated in the casing, and the collar is placed over the retaining extension and in place against the shoulder, the holes 13 and 15 are aligned to receive a locking pin 16. This pin will then obviously serve the purpose of causing the collar to turn with the plug, and will also prevent axial or unseating movement of the plug. The retaining extension may also be threaded and the retaining nut 9 screwed up against the collar to further seat the plug. This nut is not absolutely necessary, however, it being obvious that the pin 16 serves to hold the parts together. Since the collar turns with the plug 2, rotation of the latter will not tend to loosen the nut 9. In the final adjustment of the nut 9, any slight necessary axial movement of the collar relative to the extension will be permitted by a corresponding slight deformation of the pin 16.

In the invention as thus far described, it is at once apparent that the valve is to a degree tamper-proof if the blind socket collar is employed. When the pin 16 is in such a blind socket, it cannot be readily removed by driving it out, and attempts at drilling out the pin will invariably result in at least leaving an indication that the valve has been tampered with.

As a further tamper-proof feature, the casing 1 is made to define a recess 17, into which the collar fits, as shown best in Fig. 2. This recess wall may be cast integral with the casing, or there may be an attached sheet metal member caused to form the recess. In the latter case, the walls forming the recess may be crimped down over the collar after the pin 16 is in place. In the cast type, a hole 18 may be drilled through the wall 19 of the recess 17 in alignment with the hole 15 in the seated plug 2. Thus, when the plug and collar are in place, the pin 16 may be inserted through hole 18 and driven home, as shown. The driven end 20 of the pin 16 is then clear of the wall 19 and the plug may be rotated. This arrangement hides the location of the pin, except when the pin is aligned with the hole 18, and therefore one desiring to remove the pin by drilling cannot know where to drill unless it is possible to destroy the external locking devices and then turn the plug until the pin appears.

It may be further desirable to so locate the pin 16 with respect to the opening 4 of plug 2, so that the pin 16 never aligns itself with the hole 18 in any of the operating positions of the valve. In Fig. 4, for example, the pin 16 is shown located at a 45° angle to the plug opening 4. It is apparent from this arrangement that when the plug is adapted for clockwise rotation to the open or "on" position, the pin 16 will never be observed passing the hole 18. Other angles and other locations of both the pin 16 and the hole 18 may obviously be resorted to to accomplish the same result.

It is of particular value to have the pin at an angle to the hole 18 in the positions of the plug in which the latter may be locked by external means. When the plug is so locked against rotation there is obviously no means for searching for the hole 13 by recourse to rotating the plug until the pin 19 is discovered passing the hole 13.

From the above disclosure, it is apparent that a new and useful retaining arrangement has been effected whereby it is impossible to disassemble the retaining means by usual methods, and in any event all efforts to tamper with the device will be indicated by the necessary damage to the device.

It is further apparent that when a valve embodying our invention has been tampered with there is no end play developed, even if the nut is removed or the stem twisted off. The elimination of end play is very important when it is considered that even an unseating movement of 1/64 of an inch can cause a large leakage of gas, with the attendant danger of an explosion taking place.

The foregoing description is made for purposes of description only, and the invention is not to be limited to the specific embodiments shown, but is to be construed as broadly as possible within the scope of the appended claims.

We claim:

1. In a device of the class described, a casing, a tapered seat in said casing, a shoulder formed in the casing at the small end of the seat, a tapered plug member rotatable in the seat, a retaining extension on the small end of the tapered plug, a retaining collar, said collar being adapted to surround the said retaining extension and to ride on the said shoulder, locking means comprising a pin extending from one side of the collar through the extension and partially into the other side of the collar, the said pin ending in a blind socket in the said other side of the collar, a wall formed on the casing and extending from the said shoulder to closely surround the said collar, the wall having a single aperture therein to permit insertion of the pin into the collar and extension, whereby access to the pin is blocked when the plug is rotated to other positions.

2. The device of claim 1, wherein the aperture in the recess wall and the pin are out of alignment in open and closed positions of the plug.

3. In a valve, a casing having a tapered seat, a tapered plug for use in the seat, a retaining extension on the small end of the tapered plug, a retaining collar to surround the retaining extension, a shoulder in the casing adjacent the small end of the tapered seat, said collar being adapted to ride on the shoulder, a locking pin extending through at least one side of the collar and into the extension, and a wall depending from the casing and defining a recess, said collar being closely surrounded by the said wall so that access to the pin is blocked.

4. In a valve, a casing having a tapered seat, a tapered plug for use in the seat, a retaining extension on the small end of the tapered plug, a retaining collar to surround the retaining extension, a shoulder in the casing adjacent the small end of the tapered seat, said collar being adapted to ride on the shoulder, and a locking pin extending through one side of the collar, completely through the retaining extension and ending in a blind socket in the other side of the said collar, whereby the pin cannot be driven from its seat.

5. In a valve device of the class described, a casing, a tapered seat in said casing, a bearing surface formed on the casing at and surrounding the small end of the tapered seat, a tapered valve plug member rotatable in the seat, a retaining extension on the small end of the tapered plug, the retaining extension having a first unthreaded portion and a second threaded portion, the unthreaded portion being adjacent the small end of the plug and the threaded portion being remote from the small end, a retaining collar, said retaining collar being adapted to surround the said first portion of the retaining extension and to ride on the said bearing surface, first locking means comprising a pin extending from one side of the collar through the extension and partially into the other side of the collar, the said pin ending in a blind socket in the said other side of the collar, the arrangement being such that the first locking means comprising the pin and collar will retain the tapered plug in the seat, and a second locking means comprising a threaded retaining nut adapted to be drawn up on the second portion of the retaining extension to bear against the retaining collar, the second locking means comprising the retaining nut serving in cooperation with the first locking means to retain the tapered plug in the seat, the first locking means serving to retain the plug if the retaining nut is rendered ineffective.

6. In a valve device of the class described, a casing, a tapered seat in said casing, a bearing surface formed on the casing at the small end of the tapered seat, a tapered valve plug seated and rotatable in the seat, a retaining extension on the small end of the tapered plug, the retaining extension having a threaded portion, a retaining collar surrounding said retaining extension and engaging said bearing surface, first locking means comprising a pin inserted in apertures extending through at least one side of the collar and into the retaining extension, the arrangement being such that the first locking means comprising the pin and collar will retain the tapered plug in the seat, and a second locking means comprising a threaded retaining nut adapted to be drawn up on the threaded portion of the retaining extension to bear against the retaining collar, the second locking means serving in cooperation with the first locking means to retain the tapered plug in the seat, the first locking means serving to retain the plug if the retaining nut is rendered ineffective.

7. A device as in claim 6 and further including a wall extending from the casing and surrounding the retaining collar, so that the position of said pin cannot be detected.

8. A device as in claim 7 and further including an aperture in the wall for insertion of the pin into the collar and retaining extension in one position of the tapered plug in the casing, the arrangement being such that the pin is out of alignment with said aperture in the wall when the tapered plug is in other predetermined positions.

9. In a rotary plug valve having a casing provided with a tapered seat and a tapered plug rotatable therein, the combination comprising a retaining extension on the small end of the plug, means defining an outwardly-facing bearing surface on the casing at the small end of the seat, a retaining collar on said extension and bearing against said surface, a nut threaded on said extension and bearing against said collar for drawing the plug into the seat until the sealing surfaces of the plug and seat are in optimum engagement, and means substantially permanently securing said collar to said extension comprising a pin extending transversely through at least one side of said collar and into said extension.

WALTER J. BOWAN.
WALLACE E. GOULD.

References Cited in the file of this patent

UNITED STATES PATENTS

| Number | Name | Date |
|---|---|---|
| 923,090 | Toback | May 25, 1909 |
| 1,101,868 | McCoy | June 30, 1914 |
| 1,559,585 | Peterson | Nov. 3, 1925 |
| 1,898,577 | Ford | Feb. 21, 1933 |
| 2,133,580 | Searle | Oct. 18, 1938 |
| 2,138,767 | Matthews | Nov. 29, 1938 |
| 2,342,664 | Haessler | Feb. 29, 1944 |